(12) United States Patent
Skanning et al.

(10) Patent No.: US 6,721,720 B2
(45) Date of Patent: Apr. 13, 2004

(54) METHODS AND STRUCTURE FOR CHARACTERIZATION OF BAYESIAN BELIEF NETWORKS

(75) Inventors: Claus Skanning, Dronninglund (DK); David W. Wright, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 09/790,921

(22) Filed: Feb. 22, 2001

(65) Prior Publication Data

US 2002/0116351 A1 Aug. 22, 2002

(51) Int. Cl.$^7$ ................................................. G06N 5/02
(52) U.S. Cl. .............................. 706/46; 706/45; 706/12
(58) Field of Search ............................... 706/45, 46, 12

(56) References Cited

U.S. PATENT DOCUMENTS 6,535,865 B1 * 3/2003 Skaaning et al. .............. 706/52

OTHER PUBLICATIONS

Claus Skaanning, Acquisition and Transformation of Likelihoods to Conditional Probabilities for Bayesian Networks, Sep. 25, 1998, AAAI, Symposium on Al Equipment Maintenance, 1–17.*

Skaanning et al.; E–Decisions–on–Tap: E–Services for Decision Support; Conference Proceedings—HP–Word 2000, Philadelphia; Sep. 2000.

Skaanning et al.; Acquisition and Transformation of Liklihoods to Conditional Probabilities for Bayesian Networks; Conference Proceedings—AAAI Symposium on AI in Equipment Maintenance; Sep. 25, 1998.

Jensen et al.; The SACSO System for Troubleshooting of Printing Systems; Conference Proceedings—Scandinavian Conference of AI; Feb. 2001.

Skaanning; A Knowledge Acquisition Tool for Bayesian-–Network Troubleshooters; Confrence Proceedings—UAI–2000, Stanford University; Jun. 2000.

Skaanning et al.; Printer Troubleshooting Using Bayesian Networks; Conference Proceedings—IEA/AIE–2000, New Orleans; Jun. 2000.

* cited by examiner

*Primary Examiner*—Anil Khatri
*Assistant Examiner*—Joseph P. Hirl (57) ABSTRACT

Methods and structure for estimating computational resource complexity for a Bayesian belief network ("BBN") model for problem diagnosis and resolution. Bayesian belief networks may be bounded with respect to application to resolution of particular problem. Such bounded BBNs are found to consume memory resources in accordance with a mathematical model of polynomial complexity or less. Applying this model to estimate the computational memory resources required for computation of the BBN model permits effective management of distributing BBN computations over a plurality of servers. Such distribution of BBN computations enables improved responsiveness to servicing multiple clients requesting BBN applications to multiple problem resolutions. The present invention provides the requisite estimates of BBN computational resource consumption complexity to enable such improved management in a client/server problem diagnostic environment

21 Claims, 7 Drawing Sheets

LOAD ESTIMATOR
↓
GATHER BOUNDED ATTRIBUTES OF SELECTED BBN — 200
↓
CALCULATE ESTIMATED SIZE REQUIRED FOR BBN COMPUTATIONS BASED ON GATHERED ATTRIBUTES — 202
↓
RETURN ESTIMATED SIZE FOR BBN COMPUTATIONS — 204
↓
DONE

FIG. 3

SIZE OF BBN

| Network | #causes | #actions | #questions | JT size (kB) | Clique size | D-Engine data structure size (kB) |
|---|---|---|---|---|---|---|
| 02 Warming up | 6 | 8 | 6 | 15 | 222 | 157 |
| 13.04.42 | 5 | 5 | 3 | 9 | 118 | 91 |
| 13_0pjam | 29 | 28 | 10 | 66 | 2488 | 600 |
| 13_1pjam | 13 | 13 | 3 | 21 | 502 | 210 |
| 13_2pjam | 17 | 19 | 2 | 29 | 826 | 248 |
| 79_service_xxxx | 12 | 18 | 6 | 29 | 674 | 280 |
| Light print | 22 | 22 | 5 | 43 | 1332 | 361 |
| Dataflow local | 48 | 34 | 9 | 98 | 4638 | 970 |
| Dataflow_NW | 89 | 70 | 16 | 254 | 15838 | 2696 |
| Dataflow_NW_jetdirect | 78 | 61 | 15 | 212 | 12624 | 2232 |
| Dataflow_NW_parallel | 66 | 49 | 11 | 153 | 8362 | 1588 |

SPEED OF FINDING THE BEST NEXT STEP

| Network | #causes | #actions | #questions | Time of finding best first step (secs) | Start time w precompiled probabilities (secs) | Start time w/o precompiled probabilities (secs) |
|---|---|---|---|---|---|---|
| 02 WARMING UP | 6 | 8 | 6 | 0.04256 | 0.016 | 0.053 |
| 13.04.42 | 5 | 5 | 3 | 0.01032 | 0.013 | 0.038 |
| 13_0pjam | 29 | 28 | 10 | 0.3634 | 0.041 | 0.499 |
| 13_1pjam | 13 | 13 | 3 | 0.02113 | 0.019 | 0.120 |
| 13_2pjam | 17 | 19 | 2 | 0.01442 | 0.022 | 0.186 |
| 79_service_xxxx | 12 | 18 | 6 | 0.07782 | 0.023 | 0.131 |
| Light print | 22 | 22 | 5 | 0.05789 | 0.027 | 0.288 |
| Dataflow local | 48 | 34 | 9 | 0.39998 | 0.064 | 1.08 |
| Dataflow_NW | 89 | 70 | 16 | 2.86322 | 0.176 | 4.62 |
| Dataflow_NW_jetdirect | 78 | 61 | 15 | 1.77045 | 0.147 | 3.45 |
| Dataflow_NW_parallel | 66 | 49 | 11 | 1.46171 | 0.105 | 2.23 |

METHODS AND STRUCTURE FOR CHARACTERIZATION OF BAYESIAN BELIEF NETWORKS

RELATED PATENT APPLICATION

The subject matter of the present patent application is related to co-pending, commonly owned patent application Ser. No. 09/261,769, filed on Mar. 3, 1999 for A METHOD FOR KNOWLEDGE ACQUISITION FOR DIAGNOSTIC BAYESIAN NETWORKS, and to co-pending, commonly owned patent application Ser. No. 09/758,891, filed on Jul. 14, 1999 for AUTOMATED DIAGNOSIS OF PRINTER SYSTEMS USING BAYESIAN NETWORKS, and to co-pending, commonly owned patent application Ser. No. 09/388,891, filed on Sep. 2, 1999 for AUTHORING TOOL FOR BAYESIAN NETWORK TROUBLESHOOTERS.

BACKGROUND OF THE INVENTION

1. Field of the Invention

The invention relates to the probabilistic diagnostics and procedures and more specifically relates to techniques and systems for estimating resource needs of Bayesian belief networks as applied to diagnostic systems.

2. Discussion of Related Art

In general, diagnostic techniques applied to a variety of problem domains evaluate particular evidence or constraints and determine an appropriate next step in the process based on probabilities associated with the particular evidence or constraints. Humans conduct such diagnosis on a regular basis in solving a variety of problems. Computing systems are often applied to resolving similar problems utilizing similar probabilistic techniques based on gathered evidence and constraints.

Troubleshooting and diagnostic "wizards" are exemplary of common automated diagnostic systems. Such wizards in computing systems usually accept input from a user indicating the nature of a problem to be resolved. Through a number of question and answer interactions with the user, the wizard narrows the possible solutions to the problem. In other words, the wizard diagnoses the problem by applying probabilistic analysis given a set of constraints supplied by the user. Troubleshooting and diagnostic wizards are frequently used to provide automated troubleshooting assistance for end-users of computing systems to enable end-users to rapidly diagnose unresolved problems without resorting to interaction with customer support representatives associated with the computing systems.

A variety of mathematical models have been applied to improve the diagnostic capability of such computing systems used for such problem diagnosis. One popular such model is often referred to as a Bayesian belief networks ("BBN"). Bayesian belief networks iteratively apply Bayes rule to infer a probable event or next step in the problem diagnosis based on evidence or constraints and associated probabilities. A Bayesian belief network is therefore often represented mathematically as a collection of nodes representing particular events or states associated with gathered evidence and arcs connecting the nodes representing probabilistic dependence between the various events represented by the nodes. By extending the representation of a Bayesian belief network with information such as cost of steps, explanations for steps and the like, BBNs can be usefully applied to troubleshooting of user problems.

Use of such BBN techniques and automated (computerized) problem diagnostic systems gives rise to a number of complexities due to the computational complexity of the BBN probability determinations. Use of a BBN technique requires substantial computational resources including CPU processing cycles and memory for computing possible states and associated probabilities. Lack of predictable available computing resources is problematic in performing BBN techniques. The computational resources consumed in applying BBN techniques has been heretofore viewed as highly unpredictable. No accurate model has been proposed to estimate the resources required for utilizing the BBN network for a particular problem resolution given a set of constraints. For this reason, known BBN diagnostic tools are limited, as a practical matter, to operation on a dedicated computational server. In other words, a single BBN diagnostic tool operating to resolve a single problem on behalf of a single user/client is permitted to consume all available resources on a single dedicated computational server.

This complexity and associated need for dedicated computing resources has diminished the utility of BBN diagnostic tool systems because they are not easily managed in a client/server computational architecture where a single BBN diagnostic server may provide services for a plurality of requesting clients. When a single computational server must be dedicated to one BBN network computation, the BBN diagnostic tool is not easily scaled in a client/server model to permit a larger number of clients to be serviced.

It is evident from the above discussion that a need exists to better characterize the computational resources required of a BBN diagnostic system to permit improved management of computational resources for BBN diagnostic tools in a client/server application architecture.

SUMMARY OF THE INVENTION

The present invention solves the above and other problems, thereby advancing the state of the useful arts, by providing a polynomial model of the computational resources required for a BBN diagnostic tool to resolve a particular constrained problem. Using such an improved characterization of BBN computational complexity, management techniques (outside the scope of the present invention) may appropriately manage the distribution of BBN diagnostic computations over one or more computational servers operating on behalf of a plurality of requesting client's. In other words the improved estimation of BBN computational resources in accordance with the present invention enables effective management of computational resources to permit better scaling of BBN server resources to service multiple clients.

Empirical data suggests that BBN diagnostic computations are both memory and CPU intensive. While CPU utilization is a well-known manageable problem, storage utilization must be carefully managed to avoid fatal errors in operation of a BBN computational models. Further empirical data shows that BBN storage requirements may be accurately estimated in accordance with polynomial computational complexity. This simply computed estimate of required resources allows well-known management techniques to more accurately distribute the load of BBN services over one or more servers to purposes of serving multiple clients.

A further advantage of the present invention is that by permitting management of multiple BBN services operable on one or more server nodes, multiple BBN models may be run in parallel on behalf of a single client request. Such parallel multiple model operation allows model matching processing. Model matching as used herein refers to the process of finding a model that best handles the problem of the user. This can be done, for example, by running a number of competing models in parallel until it becomes apparent which model is the most suitable. Running multiple models for such model matching is another benefit of managing the operation of multiple BBN model executions distributed over a network of servers.

The above, and other features, aspects and advantages of the present invention will become apparent from the following descriptions and attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
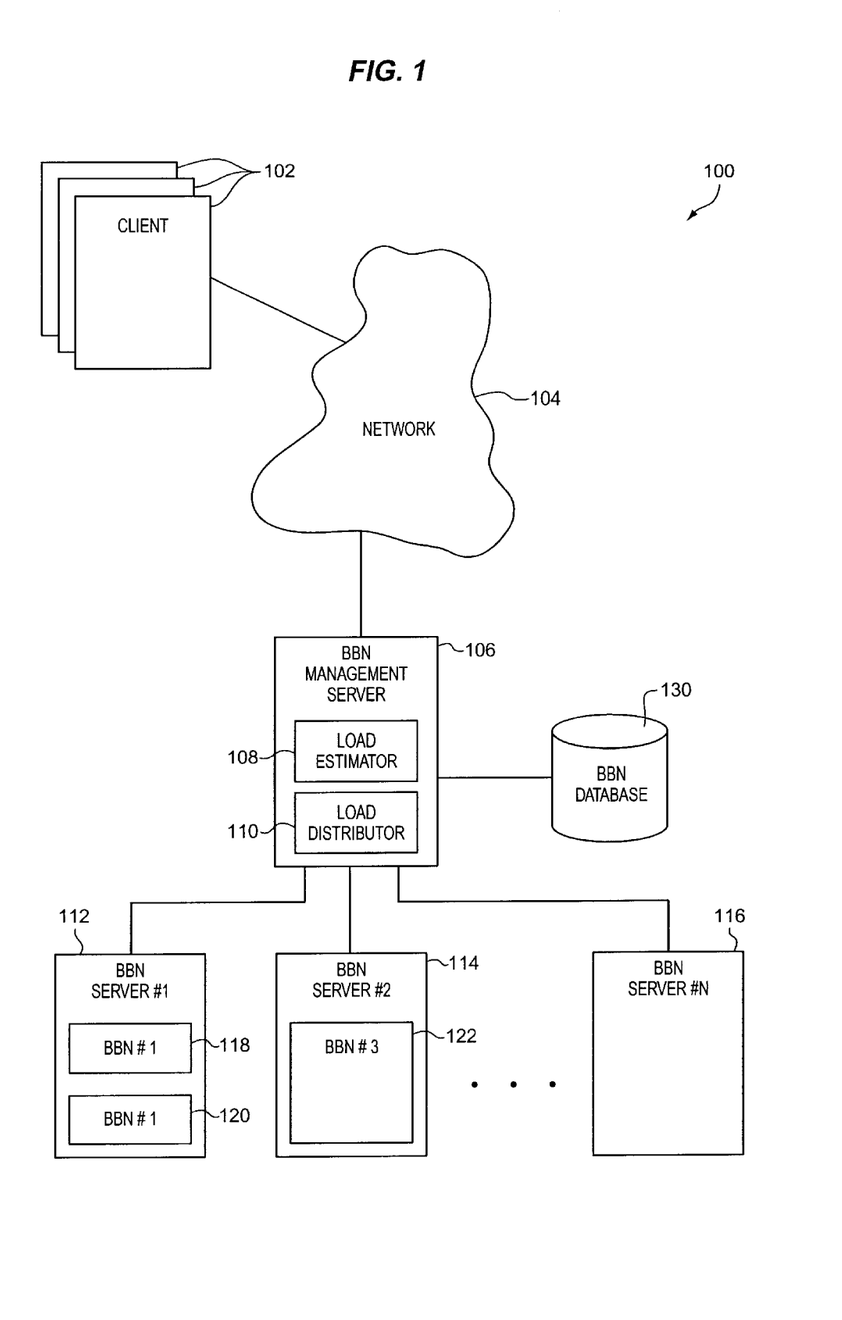
FIG. 1 is a block diagram of a system of the present invention that includes a BBN management server for estimation of computing resource loads for processing multiple BBN requests.

FIG. 1 is a block diagram of a system 100 in which the BBN resource estimates of the present invention may be advantageously applied. A plurality of clients 102 request services via a network 104 from a server for problem resolution/diagnosis. Clients 102 may be any application or user process that includes problem resolution features such as troubleshooting guides or wizards. Network 104 may be any distributed processing communication network including, for example, intranet or Internet communications. More generally, any interprocess communications may be used for such client/server interaction as is well-known in the art. The various processes depicted in FIG. 1 may therefore be physically distributed over a plurality of interconnected computing systems or may be operable in a single computing system using client/server architectures to effectuate the inter-process communications. Such design choices are well-known to those skilled in the art and need not be further discussed here.

Such requests are directed to a server process 106. Specifically, server process 106, in accordance with the present invention manages such diagnosis requests to distribute the requests to any of a plurality of computational servers 112 through 116 to process the BBN for resolution/diagnosis of the problem requested by the client 102.

In accordance with the present invention, BBN management server process 106 includes a load estimator component 108 that estimates the computational resources required to process the BBN associated with the client's inquiry. Load estimator component 108 looks in BBN database 130 for parameters or attributes of the BBN associated with the client's request. The parameters and attributes so located are used by the load estimator component 108 to compute the estimated computational resources required for the BBN. Database 130 represents any structure containing parameters and/or attributes of each BBN model known to the server 106. Use of the term database is not intended to imply a particular complex structure. Any data structure as simple as a table in memory through a more complex indexed database structure may be used for the purpose intended by element 130. Such design choices are well-known in the art.

BBN management server process 106 preferably also includes a load distributor component 110 responsive the load estimator component 108 to distribute the client's request to an appropriate BBN server process 112 through 116 based upon the estimated computational resources required for running the BBN model associated with the client's request. A server process 112 through 116 having sufficient available computational resources to process the BBN then receives the client's request from the BBN management server process 106 to actually process the client's request by computing the BBN model associated with the request. As shown in FIG. 1, BBN server process 112 is presently processing two BBN models, namely BBN #1 118 and BBN #2 120. BBN server process 114 is presently processing one BBN model on a client's behalf, namely BBN #3 122. BBN server process 116 is presently not processing any BBN model. As suggested by the relative sizes of the boxes representing BBN models 118, 120 and 122, each BBN model is provided to a BBN server process 112 through 116 capable of providing the estimated computing resources required to process the BBN model. At some time, BBN server process 112 had sufficient computing resources to permit processing of two BBN models, 118 and 120. BBN model 122 required more resources and so was sent to BBN server process 114 which had sufficient resources to process the model. Load estimator component 108 of BBN management server process 106 provided the estimate of required computing resources required for each BBN model corresponding to a client request. This estimate allows load distributor component 110 to distribute the BBN model processing in behalf of multiple clients 102 to an appropriate BBN server process 112 through 116.

It has been determined that a significant class of problems may be represented by bounded BBN models. Techniques for creation of such BBN structures for troubleshooting are presented in the referenced related, co-pending patent applications. In view of the bounds and constraints on such BBNs the present invention shows that the computational resource requirements for a BBN (i.e., memory utilization in particular) may be estimated as a simple polynomial in various attributes and parameters of the BBN. Load estimator component 108 of FIG. 1 therefore utilizes such a polynomial computation to estimate the computational resource requirements of the processing of the BBN corresponding to any selected problem analysis (i.e., any particular troubleshooting process).

Figure 2:
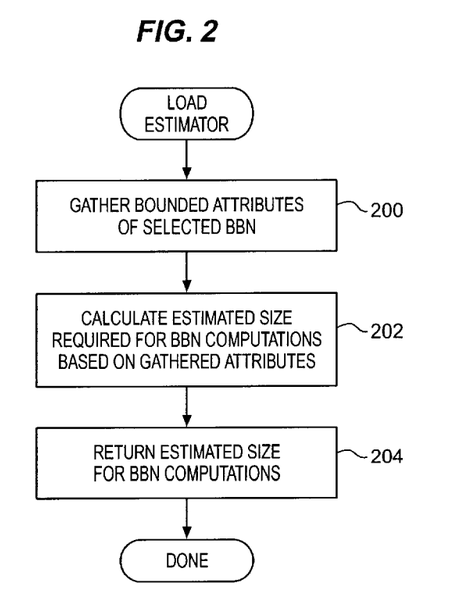
FIG. 2 is a flowchart describing additional details of the operation of the load estimator component of the BBN management server of FIG. 1.

FIG. 2 is a flowchart describing operation of the load estimator component 108 of FIG. 1 to estimate the computational resources required to process a given BBN on behalf of a particular requesting client process. Element 200 first gathers the attributes and parameters of the bounded BBN selected by the user (the selected problem to be diagnosed). As noted above, these parameters and attributes are retrieved from a table or database structure that associates the parameters and attributes with a BBN for a particular problem to be resolved according to the client/user request. Element 202 then calculates the estimated computing resources required for processing the selected BBN according to the parameters and attributes retrieved for the selected BBN. The preferred polynomial estimate is discussed further herein below. Element 204 then returns the calculated estimate for further utilization in distributing the load of processing multiple BBN models on behalf of a plurality of client requests.

Figure 11:
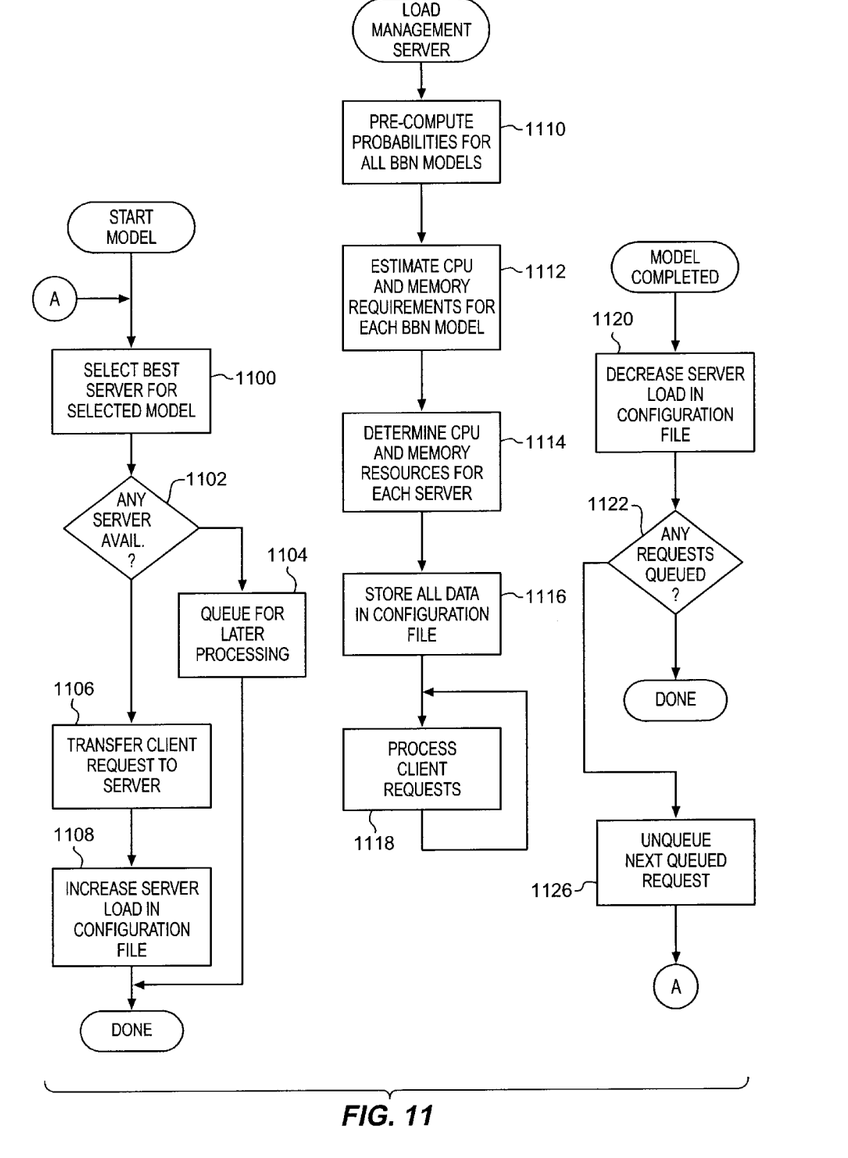
FIG. 11 is a flowchart describing overall methods of operation of the BBN management server of FIG. 1.

FIG. 11 is a flowchart providing details of the overall methods of operation of the BBN management server for estimating load requirements of a Bayesian network and distributing multiple such BBN requests to a plurality of servers based on balancing of the estimated computational resource loads of the BBNs. Element 1110 first pre-computes the probabilities for all BBN models known to the managements server system. As noted further herein below, pre-computing these probabilities improves the initial startup time for the BBN model computation to thereby improve the user's perception of responsiveness. Element 1112 then computes the estimated CPU time and storage size requirements for each BBN known to the system. Element 1114 then determines the CPU and storage space resources available on each server in the system to be used for BBN computations. Element 1116 then stores all parameters determined by operation of elements 1110 through 1112 in a configuration file on the management server. Elements 1118 then iteratively processes each BBN request received from a client process.

The processing of the requests involves selecting an appropriate server based on the estimated load requirements of the identified BBN and the present load on each server. Processing of a new request involves asynchronous receipt of a request from a client. The request is then distributed to a selected server. When the server completes the processing of the request, an asynchronous event is forwarded to the management server to permit other requests to be processed. The management server tracks the loading of each server and distributes new requests based on the current load and the load requirements of the identified BBN.

Elements 1100 through 1108 represent the management server processing in response to asynchronous receipt of a new BBN request from a client. Element 1100 first selects the best server for processing the client's identified BBN model. The best server is selected in accordance with the load on each server and the estimated load requirements of the client's identified BBN model. Where multiple servers have sufficient resources to process the identified model, a simple round robin or other scheduling technique may be used to distribute the model computations over multiple servers.

Element 1102 then determines whether any server was selected by operation of element 1100. If all servers are presently busy with BBN model computations such that no server has sufficient resources available to process the new client request, then the distribution of the new request will be deferred. Deferral of such a request may be implemented by simply waiting for a server to complete processing and then selecting that server. Alternatively, as depicted in FIG. 11, such deferred requests may be queued for later processing when earlier requests are eventually completed. If no server presently has capacity for processing the new client request, element 1104 queues the request for later processing and the method is complete until a server becomes available for processing the request.

If a server is presently available as determined by element 1102, element 1106 is then operable to transfer the client BBN request to the selected server. Element 1108 then increases the present load statistics in the configuration file to reflect the new load on the selected server increased by virtue of processing the new client request.

Elements 1120 through 1126 represent the management server's processing in response to receipt of an asynchronous event indicating completion of computations for a client's BBN model request. Element 1120 first decreases the server's present load statistics in the configuration to reflect completion of the BBN model processing load. The server having just completed processing of a particular client's BBN model will then have available resources for processing of new additional client BBN model requests. Element 1122 then determines whether any earlier client requests have been queued awaiting availability of an appropriate server. If so, Element 1126 is operable to unqueue the next queued request and processing then continues at element 1100 (label "A") to locate an appropriate server.

Those skilled in the art will recognize that the flowchart of FIG. 11 is intended merely exemplary of one embodiment of a management server programmed to estimate load requirements for a BBN model and distribute BBN model requests to multiple servers in a manner to balance the load for processing the BBN requests over the servers. Many equivalent structures and methods of utilizing such load estimates and load distribution will be readily apparent to those skilled in the art.

Figure 3:
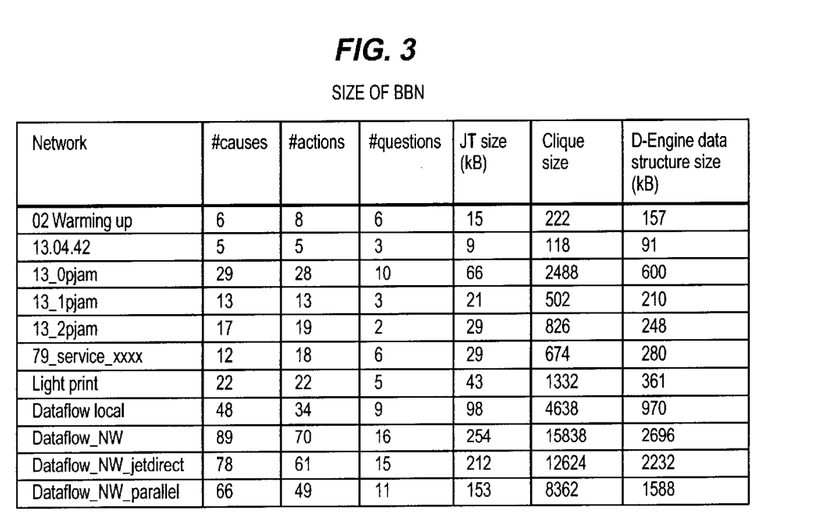
FIG. 3 is a table providing empirical data for several parameters of a number of exemplary Bayesian networks and the estimated complexity of each network in terms of storage size requirements.

Mathematical proofs (not shown) as well as empirical data shows that the computational resource as measured in size for a bounded BBN is computable in polynomial complexity. FIG. 3 is a table wherein each row represents an exemplary actual BBN ("Network" column) for resolution of a particular associated problem and related parameters and attributes of that network. The second column ("# causes") indicates the number of known possible causes of the related problem to be diagnosed. The third column ("# actions") indicates the number of possible actions to be taken to resolve the corresponding problem (more generally to further diagnose the corresponding problem). The fourth column indicates the number of questions that may be posed to the client to further constrain the problem for diagnosis. The fifth and sixth columns indicate the junction tree ("JT") size and clique size of the BBN structure for diagnosing this problem. As is known in the art, a Bayesian network as applied to inference is converted into a structure referred to as the junction tree for more efficient computation. The junction tree is a tree of cliques where a clique is a set of variables from the Bayesian network that are all connected. The clique size as used herein therefore refers to the storage size of the clique stored as the joint probability distribution of the variables of the clique or in other words, the product of the number of states for all variables in the clique. Computations use these structures because there can be loops in the underlying Bayesian network but not in the junction tree representation of the network. The last column ("D-Engine data structure size") is the size (in kilobytes) of the data structure used in a particular embodiment of a BBN processing engine to represent the BBN for this particular problem. Those skilled in the art will recognize that each implementation may vary this last size somewhat in that varying data structure representations of the BBN may have somewhat more or less memory overhead associated with the structure. However, the dominant factor in the size of the structure remains the parameters and attributes of the BBN—namely the numbers of causes, actions and questions.

The particular data in the table of FIG. 3 represents a selection of typical problems to be resolved in the operation of a common laser printer. For example, a common paper jam problem to be resolved has an associated BBN named "13_2pjam" in the fifth row of the table. This particular exemplary BBN has 17 causes, 19 actions and 2 questions to further refine the problem definition for resolution. From these parameters/attributes, the BBN has a junction table size of 29 kilobytes and a clique size of 826 floating point numbers (i.e., 826×4 bytes per floating point number of typical 32 bit processors or about 3304 bytes). The resultant data structure for representing this exemplary BBN including all overhead information for a particular implementation is 248 kilobytes. All entries in the table of FIG. 3 represent actual BBN implementations for resolution of particular problems but are intended merely as exemplary of typical such entries. Those skilled in the art will recognize that the particular data in the table of FIG. 3 are not intended to limit the scope of the invention to those particular structures or those particular problems.

Figure 4:
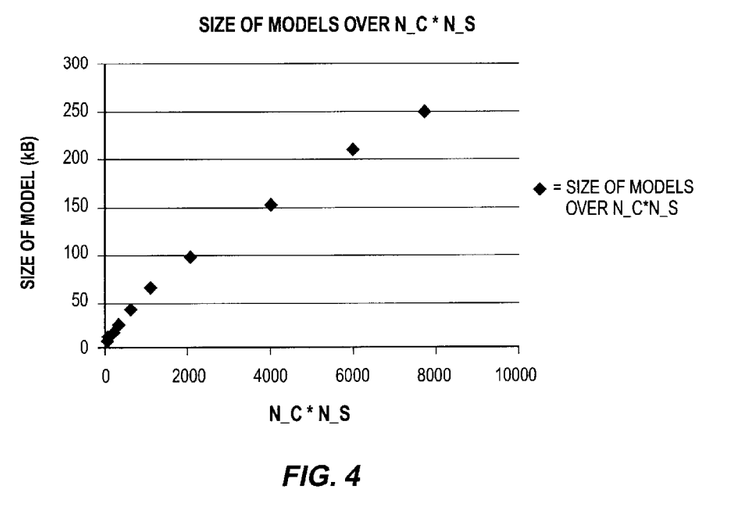
FIGS. 4–6 are graphs of data in the table of FIG. 3 that depict the polynomial or less complexity of estimating the BBN storage size requirements.
Figure 5:
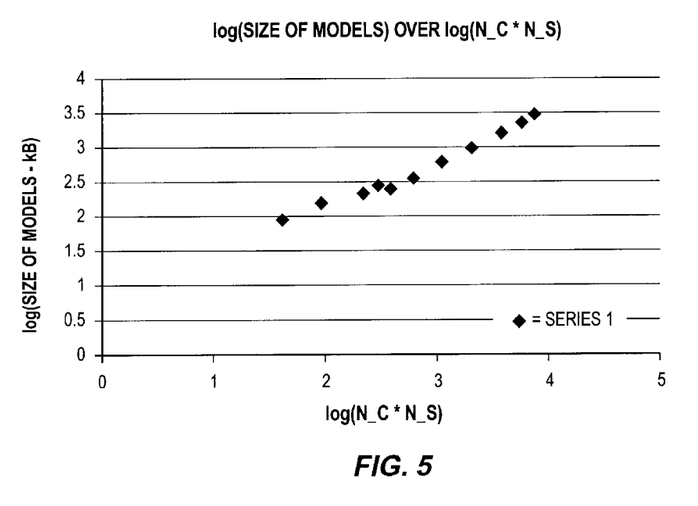

From the data in FIG. 3 it can be seen that the size of the BBN (as measured by the data structure size in the last column) can be estimated by a computation as having polynomial complexity or less. FIG. 4 is a graph of the data in FIG. 3 showing the size of a BBN model as a function of the number of causes times the number of steps (N_C*N_S) where the number of steps (N_S) is the number of actions plus the number of questions (N_S=N_A+N_Q). The graph of the data points shows that the complexity of the model (measured in size of the model) is less than polynomial. FIG. 5 is another graph of the data in FIG. 3 further confirming the complexity of the BBN models is less than polynomial. Specifically, FIG. 5 is a logarithmic graph of the same data points.

In particular, the data and graphs of FIGS. 3, 4 and 5 demonstrate that the complexity of the BBN model can be computed as:

$$y=2*x^{0.8}$$

where y is the size of a BBN model and x is (N_C*N_S).

Figure 6:
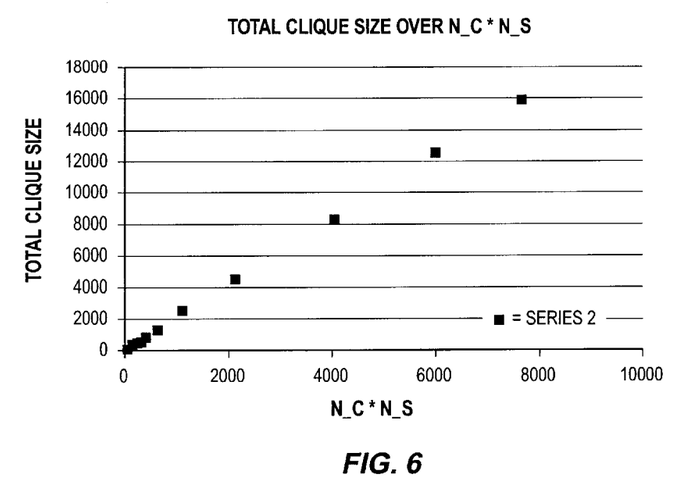

FIG. 6 is a graph of the data of FIG. 3 showing the complexity of a BBN model measured as the clique size as a function of (N_C*N_S). This graph further confirms that the complexity of the model is not more than polynomial complexity (i.e., O(N_C*N_S)).

Similar data analysis can be applied to determine the complexity of a BBN model as measured in time. For example, the complexity of a model can be measured in time required to finding the best first step in a problem resolution. Other measures of time complexity of a BBN model include the start time. The start time of a BBN model as used herein means the time required for the Bayesian network to initialize such that the model is ready to compute the first step. This start time includes loading of the Bayesian network definition, initializing the associated data structures of the implementation and performing one initial belief propagation to obtain the correct probabilities for all variables.

Figure 7:
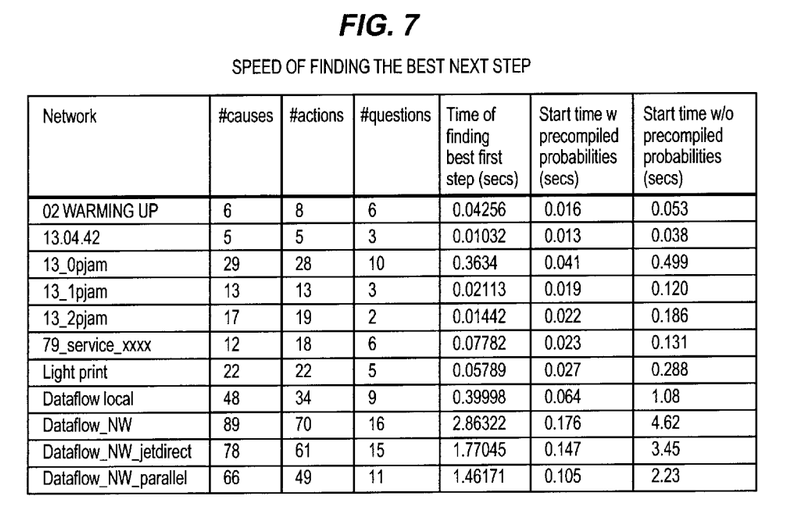
FIG. 7 is a table providing empirical data for several parameters of a the exemplary Bayesian networks of FIG. 3 and showing the estimated complexity of each network in terms of computation time requirements.

FIG. 7 is a table of data indicating such time based measurements of the same set of BBN models shown in FIG. 3. The first four columns of the table of FIG. 7 are identical to that of FIG. 3, namely the name of the model (the problem name), the number of causes, number of actions and number of questions. Column 5 indicates the time (in seconds) to finding the best first step in resolving the corresponding problem. Column 6 indicates the "start time" for the model with precompiled probabilities and column 7 indicates the same "start time" without precompiled probabilities. The probabilities referred to are those needed during the startup computations of the BBN to ensure rapid processing of subsequent steps. Once the BBN is defined, these probabilities may be pre-computed and stored (compiled) as attributes of the BBN data structures. With such pre-computed probabilities compiled into the BBN data structures, the time to process the start phase of the BBN model is dramatically reduced as shown in the table of FIG. 7. This reduced time translates to more rapid response perceived by the client process requesting BBN computation services.

Figure 8:
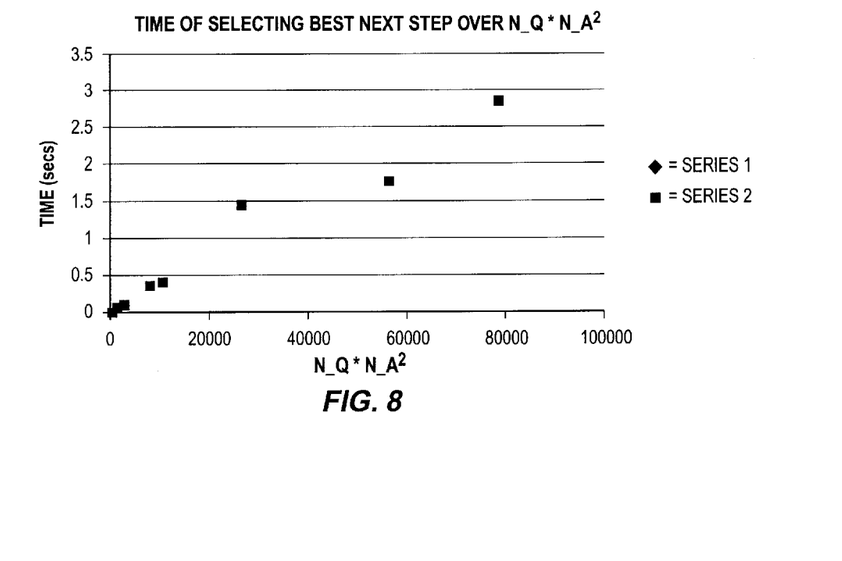
FIGS. 8–10 are graphs of the data in the table of FIG. 7.
Figure 9:
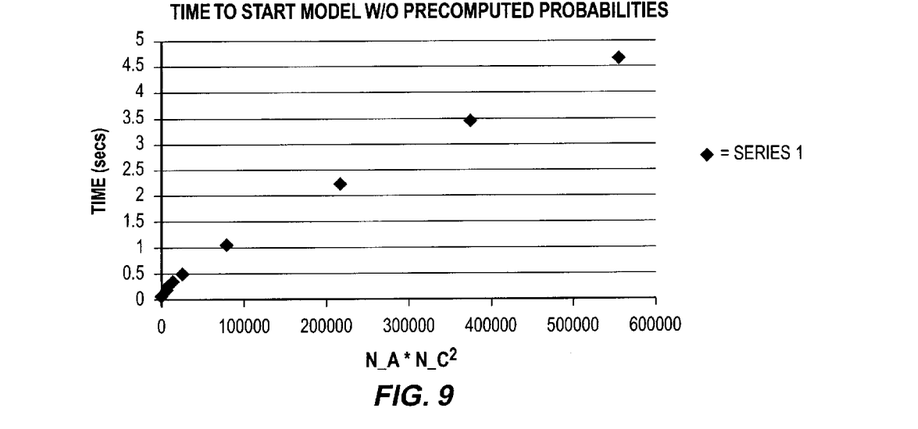
Figure 10:
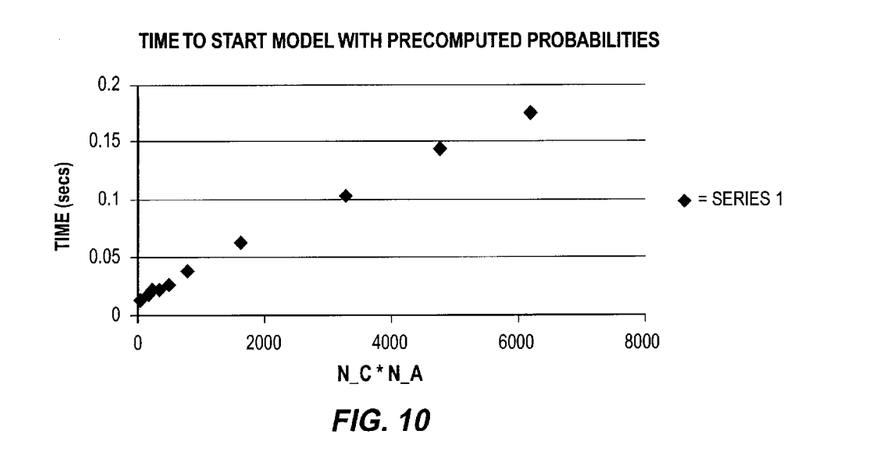

The table of FIG. 7 and the associated graphs of FIGS. 8–10 demonstrate that the complexity of a BBN model as measured in computational time may also be determined for purposes of managing and distributing the load of multiple BBN computations over multiple servers. In fact, determining the start time with precompiled probabilities (column 6 of the table of FIG. 7) is computable in polynomial complexity or less as shown in the graph of FIG. 10. The graphs of FIGS. 8 and 9 also show that the measures of columns 5 and 7 of FIG. 7 are computable in polynomial complexity or less.

Such measures of time are also useful in managing the distribution of the load of multiple BBN computations. For example, if a threshold parameter suggests that the maximum time to respond to a user's request for troubleshooting is 5 seconds and a single BBN model computation is estimated to take 1 second on a particular server system, then no more than 5 parallel computations should be allocated to that particular server system. Such load management computations may be used in conjunction with the above discussed storage size related load management structures and methods or as a separate load management function.

Those skilled in the art will recognize an important variable not accounted for in the data of FIGS. 7–10. Namely, the speed of a particular system used for the BBN computation as well as for the estimation computations for load management. In this sense, the data of FIGS. 7–10 may be thought of as normalized to a particular exemplary standard of system performance. The relationships of the measurements would most likely scale linearly with the system performance of a particular system of interest.

Normalized in such a manner to an Intel Pentium II processor clocked at 500 mHz, the time to determine the best first step in the BBN model (as depicted in the table of FIG. 7 and in the graph of FIG. 8) may be estimated as:

$$T=0.000036x+0.046$$

where T is the time in seconds and $x=N\_Q*N\_A^2$. The time to start computation of a BBN model with pre-computed probabilities (as depicted in the table of FIG. 7 and in the graph of FIG. 10) may be estimated as:

$$T=0.000027x+0.016$$

where T is the time in seconds and $x=N\_C*N\_A$ And lastly, the time to start computation of the BBN model without pre-computed probabilities (as depicted in the table of FIG. 7 and in the graph of FIG. 9) may be estimated as:

$T = 0.0000084x + 0.19$ where T is the time in seconds and $x = N\_A * N\_C^2$

Figure 12:
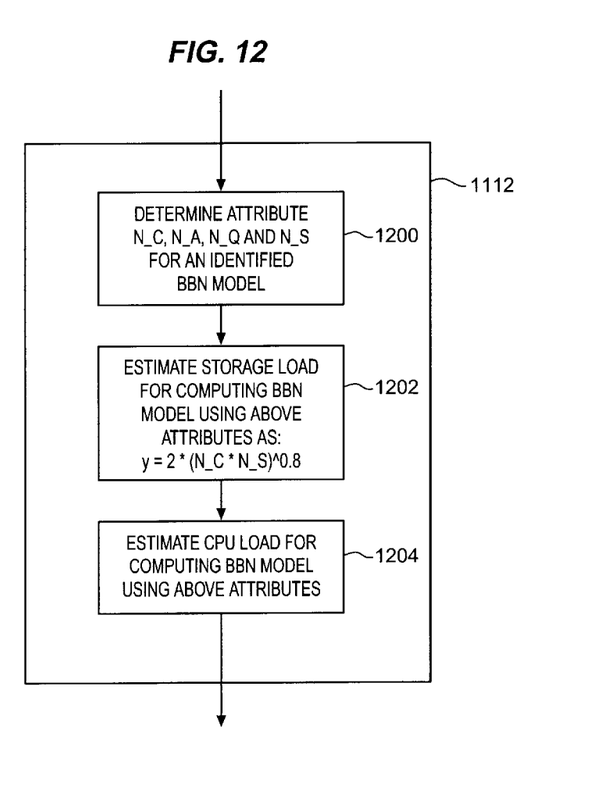
FIG. 12 is a flowchart describing additional details of the steps of estimating load for computing a particular BBN model.

FIG. 12 is a flowchart showing additional details of the processing involved in step 1112 of FIG. 11 to estimate the load for a particular BBN model. Element 1200 first determines quantitative attributes of the BBN model to be processed. Exemplary of such quantitative attributes in a BBN model of a problem to be diagnosed are: N_C (number of causes), N_A (number of actions), N_Q (number of questions) and N_S (number of steps as discussed above). In the preferred embodiment, such attributes are predetermined and stored in a structure associated with the particular BBN problem model. A database or other indexed files structure may be used where the number of BBN models is large or a simpler storage structure may be used where the number of BBN models is smaller. Thus the step of determining such quantitative attributes preferably encompasses the step of looking to the structured file to find such attributes stored in association with the identified BBN model to be computed.

Element 1202 then computes the estimated storage load for computing the identified BBN model based on the quantitative attributes determined above at element 1200. Preferably, the storage load is computed as estimated storage in kilobytes $y = 2*(N\_C*N\_S)^{0.8}$. As discussed herein, other equivalent computations may be used to estimate storage load for a BBN model including, for example, computation of clique size as an estimate of storage load.

Lastly, element 1204 computes an estimate of CPU load for computation of an identified BBN model. The CPU load is computed using any of the polynomials noted above or combinations of such estimates to best allocate available computational resources to a selected BBN model. Further, as noted above, the estimated CPU load for computation of a BBN model may be computed from the above quantitative attributes. However, the estimated CPU load is preferably used as a normalized value and is applied by scaling that value to the performance of a particular computational server on which the BBN model may be processed.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for estimating computing resource requirements of a BBN model for diagnosing a problem, said method comprising the steps of:
   determining at least one quantitative attribute of the complexity of said BBN model; and
   estimating said computing resource requirements as a function of said at least one quantitative attribute wherein the estimate is computed in accordance with polynomial complexity.

2. The method of claim 1 wherein the step of determining comprises the steps of:
   determining the number of causes (N_C) in said BBN model; and
   determining the number of steps (N_S) in said BBN model.

3. The method of claim 2 wherein the step of determining N_S consists of the step of:
   determining N_S as (N_A+N_Q) where N_A is the number of possible actions and N_Q is the number of questions in the BBN.

4. The method of claim 3 wherein the step of estimating comprises the step of:
   computing said computing resource requirements as a polynomial function of N_C and N_S.

5. The method of claim 4 wherein the step of computing comprises the step of:
   computing said computing resource requirements (y) in estimated storage space as:

$y = 2*(N\_C*N\_S)^{0.8}$.

6. The method of claim 1 wherein the step of determining comprises the steps of:
   determining the number of causes (N_C) in said BBN model; and
   determining the number of actions (N_A) in said BBN model.

7. The method of claim 6 wherein the step of estimating comprises the step of:
   computing said computing resource requirements in estimated CPU requirements as a function of N_C and N_A.

8. The method of claim 1 wherein the step of determining comprises the steps of:
   determining the number of questions (N_Q) in said BBN model; and
   determining the number of actions (N_A) in said BBN model.

9. The method of claim 8 wherein the step of estimating comprises the step of:
   computing said computing resource requirements in estimated CPU requirements as a function of N_Q and N_A.

10. A system for processing multiple BBN model requests comprising:
    a management server process for receiving BBN model processing requests from at least one client process; and
    a plurality of BBN server processes coupled to said management server process for performing said BBN model processing requests,
    wherein said management server process includes:
      a load estimator for estimating the computing resource requirements for processing each of said BBN model processing requests; and
      a load distributor for distributing each model request of said BBN model processing requests to a selected server process of said plurality of BBN server processes in accordance with a present load attribute associated with said selected server process and in accordance with an estimated computing resource requirement for processing said model request.

11. The system of claim 10 wherein said load estimator estimates said computing resource requirements of said model request as measured in storage requirements.

12. The system of claim 10 wherein said load estimator estimates said computing resource requirements of said model request as measured in CPU requirements.

13. A system for estimating computing resource requirements of a BBN model for diagnosing a problem, said system comprising:
    means for determining at least one quantitative attribute of the complexity of said BBN model; and
    means for estimating said computing resource requirements as a function of said at least one quantitative attribute wherein the estimate is computed in accordance with polynomial complexity.

14. The system of claim 13 wherein said means for determining further comprises:

means for determining the number of causes (N_C) in said BBN model; and means for determining the number of steps (N_S) in said BBN model.

15. The system of claim 14 wherein the means for determining N_S consists of:

means for determining N_S as (N_A+N_Q) where N_A is the number of possible actions and N_Q is the number of questions in the BBN.

16. The system of claim 15 wherein said means for estimating further comprises:

means for computing said computing resource requirements as a polynomial function of N_C and N_S.

17. The system of claim 16 wherein said means for computing further comprises:

computing said computing resource requirements (y) in estimated storage space as:

$$y=2*(N\_C*N\_S)^{0.8}$$

18. The system of claim 13 wherein said means for determining further comprises:

means for determining the number of causes (N_C) in said BBN model; and means for determining the number of actions (N_A) in said BBN model.

19. The system of claim 18 wherein said means for estimating further comprises:

means for computing said computing resource requirements in estimated CPU requirements as a function of N_C and N_A.

20. The system of claim 13 wherein said means for determining further comprises:

means for determining the number of questions (N_Q) in said BBN model; and means for determining the number of actions (N_A) in said BBN model.

21. The system of claim 20 wherein said means for estimating further comprises:

means for computing said computing resource requirements in estimated CPU requirements as a function of N_Q and N_A.

* * * * *

UNITED STATES PATENT AND TRADEMARK OFFICE
CERTIFICATE OF CORRECTION

PATENT NO. : 6,721,720 B2
DATED : April 13, 2004
INVENTOR(S) : Claus Skanning et al.

It is certified that error appears in the above-identified patent and that said Letters Patent is hereby corrected as shown below:

Title page,
Item [12], delete "Skanning" and insert therefor -- Skaanning --
Item [75], Inventors, delete "Skanning" and insert therefor -- Skaanning --

Signed and Sealed this

Twenty-fifth Day of January, 2005

JON W. DUDAS
*Director of the United States Patent and Trademark Office*